United States Patent [19]

Adams et al.

[11] 4,053,323

[45] Oct. 11, 1977

[54] METHOD OF USING CEMENTING COMPOSITION HAVING IMPROVED FLOW PROPERTIES

[75] Inventors: Sally Lee Adams, Pittsburgh, Pa.; Michael M. Cook, Boxford, Mass.; Fred David Martin, McMurray, Pa.

[73] Assignee: Calgon Corporation, Pittsburgh, Pa.

[21] Appl. No.: 774,294

[22] Filed: Mar. 4, 1977

Related U.S. Application Data

[60] Continuation of Ser. No. 742,734, Nov. 11, 1976, which is a continuation-in-part of Ser. No. 610,197, Sept. 4, 1975, abandoned, which is a division of Ser. No. 465,936, May 1, 1974, Pat. No. 3,936,408.

[51] Int. Cl.² ............................................. C04B 7/38
[52] U.S. Cl. ................................... 106/100; 106/104
[58] Field of Search .................. 106/90, 100, 314, 315, 106/104; 260/29.6 S, 29.6 SQ, 79.3 MU

[56] References Cited

U.S. PATENT DOCUMENTS

| | | | |
|---|---|---|---|
| 2,582,459 | 1/1952 | Salathiel | 260/29.6 S |
| 2,761,834 | 9/1956 | Suen et al. | 260/29.6 SQ |
| 2,761,856 | 9/1956 | Suen et al. | 260/29.6 SQ |
| 3,024,221 | 3/1962 | Le Fevre et al. | 260/29.6 SQ |
| 3,250,736 | 5/1966 | Gibbs et al. | 260/79.3 MU |
| 3,332,904 | 7/1967 | La Combe et al. | 260/79.3 MU |
| 3,344,174 | 9/1967 | Broussalian | 260/79.3 MU |
| 3,547,899 | 12/1970 | Arlt et al. | 260/79.3 MU |
| 3,692,673 | 9/1972 | Hoke | 260/79.3 MU |
| 4,011,909 | 3/1977 | Adams et al. | 106/90 |

*Primary Examiner*—J. Poer
*Attorney, Agent, or Firm*—Rudolph J. Anderson, Jr.; Harry E. Westlake, Jr.; Martin L. Katz

[57] ABSTRACT

Methods of using aqueous hydraulic cement compositions containing polyamido-sulfonic compounds as flow-property-improving and turbulence-inducing additives are disclosed.

4 Claims, No Drawings

METHOD OF USING CEMENTING COMPOSITION HAVING IMPROVED FLOW PROPERTIES

This is a continuation of application Ser. No. 742,734 filed Nov. 11, 1976, which is a continuation-in-part application of application Ser. No. 610,197, filed Sept. 4, 1975, now abandoned, which in turn was a divisional application of co-pending application Ser. No. 465,936, filed May 1, 1974, now U.S. Pat. No. 3,936,408.

BACKGROUND OF THE INVENTION

1. Field of the Invention

The present invention relates to an aqueous hydraulic cement slurry composition especially suitable for use in cementing operations.

More particularly, the present invention concerns polyamido-sulfonic additives for hydraulic cements used in cementing operations which improve the flow properties of the cement slurry, especially facilitating high flow rates and turbulent flow of the cement slurry when it is being pumped to its desired location during the cementing operation.

Most particularly, the present invention concerns cementing of gas and oil wells employing aqueous hydraulic cement slurries containing polyamido-sulfonic additives which improve the flow properties of the cement slurry.

"Polyamido-sulfonic", as used herein, refers to water-soluble polymers of N-sulfohydrocarbon-substituted acrylamides.

As used herein, the terms "improve the flow properties" or "flow-property-improving" are intended to describe the manner in which the polyamido-sulfonic additive compositions of the present invention facilitate or render more efficient the pumping of cement slurries, particularly the pumping of well cement slurries during primary cementing operations. This action is apparently due primarily to a reduction in the frictional drag experienced by the cement slurry while it is being pumped or moved through a confining passageway, but it is not intended to limit the described action to such a friction reducing effect, since other effects may also play a role.

The term "turbulence-inducing" is intended to describe the effect of the polyamido-sulfonic additive compositions of the present invention in promoting the departure of a moving cement slurry from laminar flow to turbulent flow. The slurry in such a state of flow no longer moves in laminae aligned along the confining conduit, but experiences a disorganized flow characterized by eddies and disturbances. The flow-property-improving and turbulence-inducing additives of the present invention reduce the apparent viscosity of a cement slurry, which in turn reduces the flow rate required to cause turbulent flow. Thus, the promotion of turbulent flow may take place simply as a reduction in the amount of pumping pressure or volume necessary to induce a state of turbulent flow for a particular cement slurry under specific pumping conditions, below that which would be required if the turbulence-inducing additive were omitted from the cement slurry composition.

In addition, since the polyamido-sulfonic flow-property-improving additives of the present invention reduce the apparent viscosity of a cement slurry to which they are added, it is possible to reduce the total aqueous content of the slurry, thus often obtaining greater compressive strengths in the monolithic solid resulting from setting of the cement; or, concomitantly, it is possible to increase the total solids content of the aqueous cement slurry while still maintaining the original apparent viscosity thereof. This latter possibility is of importance where increased total solids handling or throughput in a cement slurry transporting operation is especially desired.

The term "aqueous hydraulic cement slurry" as employed herein is also intended to include aqueous suspensions or slurries of solids constituting raw materials, precursors, or intermediate materials used in the preparation or manufacture of hydraulic cements as hereinafter defined. Thus, the present invention includes improving the flow properties of aqueous slurries of materials transported or handled during conventional wet processing of cement. This improvement allows suspension or greater quantities of solids in the water being used as a vehicle to transport and intermix the solids during wet processing. The result is an improved efficiency of operation in the form of an increased throughput of total solids being processed. Moreover, the effectively reduced total water content results in improved efficiency during the step of kiln heating or calcining of the cement precursor solids, since less energy is consumed to remove the reduced water content during the step of heating.

Thus, most industrial processes, especially in the construction industry, which entail the handling or transport of aqueous hydraulic cement slurries, are susceptible to improvement by the method of the present invention, which comprises addition to such aqueous hydraulic cement slurries of a polyamido-sulfonic compound as hereinafter described, whereby the flow properties of the slurry are improved. This flow property improvement may take the form of an increased solids content of the slurry capable of being handled at a given expenditure of pumping energy, or may take the form of an increased throughput of total slurry at a given expenditure of pumping energy.

Techniques for drilling and completing wells, particularly gas and oil wells, are well-established. Of chief concern here are those wells which are drilled from the surface of the earth to some subterranean formation containing a fluid mineral which it is desired to recover. After the fluid-containing geologic formation is located by investigation, a bore-hole is drilled through the overlying layers of the earth's crust to the fluid-containing geologic formation in order to permit recovery of the fluid mineral contained therein. A casing is then secured in position within the bore-hole to insure permanence of the bore-hole and to prevent entry into the well of a fluid from a formation other than the formation which is being tapped. This well casing is usually cemented in place by pumping a cement slurry downwardly through the well bore-hole, which is usually accomplished by means of conducting tubing within the well casing. The cement slurry flows out of the open lower end of the casing at the well bottom and then upwardly around the casing in the annular space between the outer wall of the casing and the wall of the well bore-hole. The drilling process which produces the bore-hole will usually leave behind on the wall of the bore-hole produced, a drilling fluid filter cake of mud-like material. This material is a barrier to the formation of proper bonding by any cement composition employed to produce an impermeable bond between the casing and the well wall. As a result, cementing operations have often proven inadequate, permitting fluids from other formations to migrate into the producing formation, and vice versa. Prior art solutions to this problem have included washing away the filter cake from the well wall prior to the cementing operation. However, the washing liquids themselves have introduced new problems, including reduced permeability of the producing formation.

Nevertheless, an effective cementing operation requires that the drilling fluid filter cake be removed from the well bore wall and replaced by the cement slurry in order to permit the formation of a solid layer of hardened and cured cement between the casing and the geologic formations through which the well bore-hole passes. It has been recognized in the art that removal of the drilling fluid filter cake may be accomplished by a sufficiently high flow rate for the cement slurry during its injection into the well bore-hole. Such a high flow rate will usually occur as turbulent flow.

The flow properties of cement slurries are also important during primary well cementing operations in other respects. The pressure drop in the annulus being cemented which results from friction will increase both the hydraulic horsepower required to move the cement slurry into place in a given time period, as well as the hydrostatic pressure exerted on the producing formation. Moreover, some investigators have felt that obtaining actual turbulent flow of the cement slurry is not necessary to remove the drilling fluid filter cake, and that high flow rates are sufficient where the drilling fluid has low gel strength and there is good centralization (concentric placement of the well casing within the well bore-hole). Consequently, the present invention is directed to use of cementing compositions having improved flow properties, including, but not limited to, adaptability to turbulent, especially high turbulent flow.

Prior to the discovery of flow-property-improving, especially turbulence-inducing additives for well cement compositions, achieving high flow rate and turbulent flow for conventional cement slurries presented a number of problems not normally encountered with less viscous fluids. Inducing turbulence by control of flow rate alone has required a certain minimum velocity, which in turn is dependent upon maintaining a certain minimum pressure. Particularly, where the turbulence induced is sufficient to assure removal of drilling fluid filter cake, additional pumping capacity and very high pressure levels are required. Producing high flow rates has, of course, required the same measures. These required pressure levels, especially for deep walls, have often exceeded the pressure at which many subterranean formations break down, thus giving rise to a problem of lost circulation. It also may happen that the required pressure level exceeds the capacity of the pumping equipment or the endurance of the well drilling and associated apparatus.

The present invention facilitates pumping of cement slurries at high flow rates and permits pumping of cement slurries in turbulent flow at significantly lower flow rates than would be possible using conventional cement slurry compositions, by adding to the said cement slurries a flow-property-improving and turbulence-inducing agent. The lower flow rates required for turbulence result in a corresponding reduction in the pump pressures required to force the cement slurry into place in the desired manner. Correspondingly, higher flow rates may be achieved with a reduced amount of required pressure and pumping capacity.

The present invention also permits increased use of fluid-loss control agents which have a viscosity-increasing effect on cement slurries with which they are employed. This thickening tendency otherwise requires use of only small amounts of fluid-loss control agents to avoid problems in pumping of an overly viscous cement slurry. Use of the flow-property-improving and turbulence-inducing additives of the present invention in conjunction with fluid-loss control agents produces a cement slurry having desirable flow properties, yet containing adequate quantities of the fluid-loss control agent.

2. Description of the Prior Art

U.S. Pat. No. 3,359,225 discloses an additive for Portland-type cements comprising polyvinylpyrrolidone and the sodium salt of naphthalene sulfonate condensed with formaldehyde. The additive reduces the friction encountered as the cement is flowed or pumped into place, and also permits the utilization of decreased quantities of water in the cement mixture. Harrison - U.S. Pat. No. 3,409,080 discloses an aqueous hydraulic cement slurry containing an O,O-alkylene-O', O'-alkylene pyrophosphate-urea pyrolysis product and a water-soluble, water-dispersible polymeric material. The cement composition has improved properties whereby it may be injected in a state of turbulence without the expenditure of the amount of additional energy usually required to attain such a state. Kucera — U.S. Pat. No. 3,465,824 discloses an aqueous hydraulic cement slurry containing a bisulfite-modified phenol-formaldehyde condensation product which serves as a turbulence-inducer to the slurry while being moved in a confined passageway. Hook et al. — U.S. Pat. No. 3,465,825 discloses an aqueous cement slurry containing a turbulence-inducing agent comprising the lithium salt of the condensation product of mononaphthalene sulfonic acid and formaldehyde. Scott et al. — U.S. Pat. No. 3,511,314 discloses an aqueous hydraulic cement slurry containing a turbulence-inducing, fluid-loss control agent consisting of the reaction product of (1) an amino compound selected from the group consisting of polyalkylenepolyamines, polyalkylenimines, and their mixtures, and (2) an acidic compound selected from the group consisting of carboxylic acids, sulfonic acids, polymers having a carboxyl substituent, and polymers having a sulfonate substituent. Messenger — U.S. Pat. No. 3,558,335 discloses cement compositions comprising hydraulic cement in admixture with a turbulence-inducer and silica or diatomaceous earth particles. A number of known turbulence-inducers are set out, any of which may be employed in the compositions disclosed.

SUMMARY OF THE INVENTION

In accordance with the present invention there are provided methods of cementing, particularly well cementing, and of cement handling, which employ or are applied to cementing compositions comprising hydraulic cement, water, and from about 0.01 to about 5.0% by weight of the cement of a flow-property-improving and turbulence-inducing additive comprising a polyamido-sulfonic compound. Preferably, this composition contains from about 0.1 to about 2.0% by weight (based on dry weight of cement) of the polyamido-sulfonic compound additive.

The polyamido-sulfonic compounds employed as flow-property-improving and turbulence-inducing additives for cement compositions employed in cement operations and subject to cement handling methods of the present invention may be represented by the following formula

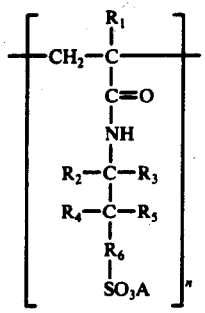

wherein $R_1$ is hydrogen or methyl; $R_2$, $R_3$, $R_4$, and $R_5$ are each independently selected from the group consisting of hydrogen, phenyl, straight or branched alkyl of from one to twelve carbon atoms, and cycloalkyl of up to six carbon atoms; $R_6$ is straight or branched alkyl of from one to twelve carbon atoms, cycloalkyl of up to six carbon atoms, phenyl, or is absent; A is hydrogen, alkali metal ion, or ammonium; and $n$ is an integer of from 2 to about 100, such that the weight average molecular weight of the polyamido-sulfonic compound is from about 200 to about 10,000, and preferably from about 200 to about 1,500.

A particularly preferred polyamido-sulfonic compound for use in the present invention is polymeric 2-acrylamido-2-methylpropane sulfonic acid comprising recurring units of the following formula:

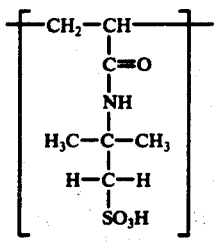

The polyamido-sulfonic compounds used in the present invention may be prepared by way of a number of conventional polymerization routes, and consequently any such method giving satisfactory yields of acceptably pure product will be suitable.

The methods of the present invention may employ or be applied to any type of hydraulic cement. Hydraulic cement is defined as any cement which will set or cure under the action of water, and is intended to include all mixtures of lime, silica and alumina, or of lime and magnesia, silica, and alumina and iron oxide. Hydraulic cements include hydraulic limes, grappier cements, pozzolan cements, natural cements, and portland cements. Pozzolan cements include slag cements made from slaked lime and granulated blast furnace slag. Among these hydraulic cements, the portland cements are preferred, chiefly because of their superior strength characteristics. The term portland cement is intended to include any cement regarded in the cementing art as a portland cement, usually as defined by standard reference works. The precise composition of any one particular portland cement will vary from another, but generally portland cements are produced by mixing and grinding together a calcareous and an argillaceous material, kiln heating the mixture (1350° to 1800° C.) until vitrification begins, pulverizing the clinker thus produced and mixing the same with a small amount of gypsum. The portland cements may be ground to any desired particle size, and grading of portland cements is on the basis of the specific surface of the cement, which will range between 1200 and 2600 square centimeters per gram. Grading is also based on the amount of cement particles retained on a No. 325 Screen, U.S. Sieve Series. Thus, preferred oil well cements have a specific surface of about 1480 square centimeters per gram and about 85% by weight passes through a No. 325 Screen.

The hydraulic cement may be employed alone in preparing the cementing composition merely being admixed with water and the flow-property-improving and turbulence-inducing additive, or it may have additionally incorporated therein any of a number of conventional cement additives. For example, the cement may include a minor portion, up to about 2.0% by weight of dry cement, of a retarder composition. Such an additive is preferred for oil well cements, since cementing operations are conducted under ambient well bottom temperatures which can exceed about 200° F. Examples of conventional retarder compositions include carboxymethylhydroxyethyl cellulose, borax, dehydrated borax, calcium lignosulfonate and ferrochrome lignosulfonate.

Fluid-loss control agents may be employed, as previously discussed. Well-known fluid-loss agents include such materials as polystyrenesulfonate, polyvinylpyrrolidone, polyvinyl alcohol, polyvinylacetate, and carboxymethylhydroxyethyl cellulose.

Weighting components comprising inert materials such as barite and ilmenite are often employed. Silica may be employed to retard high temperature strength retrogression.

Other known additives conventionally employed with cementing compositions may be employed with the cementing compositions employed with the methods of this invention, and in amounts sufficient to produce the intended modification of the cementing composition characteristics for which any additive was selected. More than one such additive, may of course, be employed at the same time.

The dry hydraulic cement component of the cementing composition is admixed with water for form a pumpable, settable cement slurry. The cement sets to form a monolithic solid. The water which is employed to form this cement slurry may be any naturally occurring water suitable for preparing cement slurries. Particularly, brines of any concentration of calcium chloride or sodium chloride or their mixtures are suitable. Sea water may be employed and is thus convenient in offshore operations. The water should be employed in an amount which is sufficient to produce a pumpable, settable slurry. Excessive amounts of water may produce a weakened finally set cement which is lacking in homogeneity owing to the settling of the aggregate portions thereof. Proper amounts of water for producing a suitable cement slurry are described in technical publications, such as the bulletins of the American Petroleum Institute (API). Increasing water content in a cement composition effects a lowering of the plastic viscosity of the cement slurry, which results in the slurry being more readily pumped in turbulent flow. However, the water content should not be in excess of the amount which will give 4.0 ml. of supernatant water for a 250 ml. sample of cement slurry which has been allowed to stand undisturbed in a 250 ml. graduated cylinder for a period of two hours. The type of hydraulic cement composition employed will also, of course, determine the amount of water required. Other factors are significant as well. For example, where silica is added to the cement composition, and high temperatures are encountered in the cementing operation (above about 250° F.), additional amounts of water will be required. Generally, the amount of water necessary to give a settable cement composition having the required characteristics, which contains the flow-property-improving and turbulence-inducing additive of the present invention will be an amount of from about 25% to about 60% by weight, based on the weight of dry hydraulic cement.

Water content may be varied in order to effect a change in the density of the cement slurry. It is customary practice to employ a cement slurry which has a density at least as great as that of the drilling fluid used in the drilling operation. Thus, densified slurries may be produced by diminishing the amount of water which would otherwise be employed.

The procedure for preparing the cementing compositions employed with the methods of the present invention does not require any particular sequence of steps. The polyamido-sulfonic flow-property-improving and turbulence-inducing additives of the present invention may be employed in the water-soluble acid, alkali metal or ammonium salt form, and simply added to the water which is used to produce the final cement slurry composition. When other conventional additives are employed, they may be incorporated into the final cement slurry compositions in any known suitable manner.

The influence of the turbulence-inducing additives of the present invention on the rheological properties of the total cement slurry composition is susceptible to mathematical characterization. Expert opinion varies as to the correct theoretical model, and thus the proper mathematical characterization of the rheological properties of cement slurries. They have been treated according to the principles of Bringham plastic fluids as well as according to the Power Law concept. The mathematical formulation employed herein is based on Fann Viscometer readings, as will be described hereinafter.

The behavior of cement slurries may be viewed as governed by the Power Law concept. For a mathematical characterization of this concept, two slurry parameters are determined: the flow behavior index ($n'$) and the consistency index ($K'$). A Fann Viscometer may be used to make these determinations. The instrument readings at 600 and 300 r.p.m. are recorded and the values for $n'$ and $K'$ are then calculated as follows:

$$n' = 3.32 \left(\log_{10} \frac{600 \text{ reading}}{300 \text{ reading}}\right)$$

$$K' = \frac{N (300 \text{ reading})}{100(511)(n')}$$

where N is the extension factor of the torque spring of the particular Fann Viscometer instrument.

The so-called Reynolds Number for a fluid moving through a conduit is the critical value at which the flowing fluid will begin to flow in turbulence. The Reynolds Number may be calculated according to the following equation:

$$N_{Re} = 1.86 \, V^{(2-n')} \rho / K'(96/D)^{n'}$$

where:
$N_{Re}$ is the Reynolds Number (dimensionless),
$V$ is the velocity, feet per second,
$\rho$ is the slurry density, pounds per gallon,
$n'$ is the flow behavior index (dimensionless),
$K'$ is the consistency index, pound-seconds per square foot,
$D$ is the inside diameter of the pipe, inches.

The velocity ($V_c$) at which turbulence may begin is readily calculated from the following equation, which is derived from the equation for the Reynolds Number, and assumes a Reynolds Number of 2100:

$$V_c = \left[\frac{1129 \, K' \, (96/D)^{n'}}{\rho}\right]^{\frac{1}{2-n'}}$$

where the different elements of the equation have the same meaning as indicated above for the Reynolds Number equation. Where the conduit through which the cement slurry passes is the annulus between the well casing and the well wall, $D = D_O - D_I$, where $D_O$ is the outer inside diameter or hole size in inches, and $D_I$ is the inner pipe outside diameter in inches.

The Power Law concept equation will give higher flow rates, or lower flow rates required to produce turbulence, where the Fann Viscometer readings are reduced.

EXAMPLE

Fann Viscometer Readings for a Cementing Composition Containing Poly-(2-acrylamido-2-methylpropane-1-sulfonic acid) Flow-Property-Improving and Turbulence-Inducing Additive A 38% Class H (API Class H cement has a fineness in the range of 1400–1600 sq. cm./gram, and contains, in addition to free lime and alkali, the following compounds in the indicated proportions: tricalcium silicate — 52, dicalcium silicate — 25, tricalcium aluminate — 5, tetracalcium aluminoferrite — 12, and calcium sulfate — 3.3.) cement slurry was made up by adding tap water (288 ml.) to a Waring blender, dissolving the indicated amount of poly-(2-acrylamido-2-methylpropane-1-sulfonic acid) turbulence-inducing additive in the water, then mixing in the cement (600 g.) at low speed. Molecular weight of the poly (2-acrylamido-2-methylpropane-1-sulfonic acid) was estimated to be less than 1000. The resultant slurry was then mixed at high speed for 35 seconds. The slurry was then stirred at high speed on a laboratory gang-stirrer for 20 minutes. The viscosity of the slurry was then immediately measured on a Fann Viscometer equipped with a No. 1 spring. The instrument readings for various speeds were recorded and are illustrated in the table of values below.

| Turbulence-Inducing Additive | % Additive (based on weight of dry cement) | Fann Viscosities at Indicated R.P.M.'s | | | |
|---|---|---|---|---|---|
| | | 600 | 300 | 200 | 100 |
| Control[xx] | — | 165 | 105.5 | 87.5 | 65 |
| Poly-(2-acrylamido-2-methylpropane-1-sulfonic acid) | 0.5 | 114.5 | 48.5 | 34.5 | 18.5 |
| | 0.25 | 104 | 88.5 | 53.5 | 25.5 |

[xx]Neat Class H cement.

The polyamido-sulfonic flow-property-improving and turbulence-inducing additive of the present invention is employed to prepare cementing compositions which are readily pumped in turbulent flow during a cementing operation, particularly a well cementing operation, at a satisfactorily low pump rate. The additive is also used to advantage to reduce the pumping pressure required for a given flow rate, or to obtain a higher flow rate at a given pumping pressure, or to increase the solids content of a slurry capable of being transported at a given pumping pressure. The cementing composition employed with the methods of this invention which has improved flow properties and is easily flowed in turbulence is employed in the conventional cementing and cement handling operations comprising the methods of the present invention in the same manner as would a cementing composition which did not contain the flow-property-improving and turbulence-inducing additive, but which was otherwise the same composition.

Obviously, many modifications and variations of the invention as hereinabove set forth can be made without departing from the essence and scope thereof, and only such limitations should be applied as are indicated in the appended claims.

What we claim is:

1. In the method of wet processing cement, comprising the steps of subjecting an aqueous slurry of hydraulic cement presursor solids to flow for the purpose of mixing and transporting said slurry, followed by kiln heating of said slurry, the improvement comprising adding to said slurry, prior to subjecting said slurry to flow, from about 0.01 to about 5.0 percent by weight, based on weight of hydraulic cement on a dry basis, of a polyamidosulfonic compound having recurring units represented by the following formula:

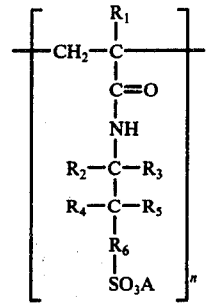

wherein $R_1$ is hydrogen or methyl; $R_2$, $R_3$, $R_4$, and $R_5$ are each independently selected from the group consisting of hydrogen, phenyl, straight or branched alkyl of from one to twelve carbon atoms, and cycloalkyl of up to six carbon atoms; $R_6$ is straight or branched alkyl of one to twelve carbon atoms, cycloalkyl of up to six carbon atoms, phenyl, or is absent; A is hydrogen, alkali metal ion or ammonium; and $n$ is an integer of from 2 to about 100, such that the weight average molecular weight of the polyamido-sulfonic compound is from about 200 to about 10,000.

2. The method of claim 1 wherein the weight average molecular weight of the polyamido-sulfonic compound added to said slurry is from about 200 to about 1,500.

3. The method of claim 1 wherein said polyamido-sulfonic compound is added to said slurry in an amount of from about 0.1 to about 2.0 percent by weight, based on weight of hydraulic cement on a dry basis.

4. In the method of wet processing cement, comprising the steps of subjecting an aqueous slurry of hydraulic cement presursor solids to flow for the purpose of mixing and transportion said slurry, followed by kiln heating of said slurry, the improvement comprising adding to said slurry, prior to subjecting said slurry to flow, from about 0.01 to about 5.0 percent by weight, based on weight of hydraulic cement on a dry basis, of a poly(2-acrylamido-2-methyl-propane-1-sulfonic acid) comprising recurring units of the following formula:

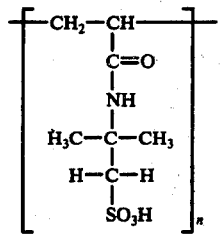

wherein $n$ is an integer of from 2 to about 100, such that the weight average molecular weight of the poly(2-acrylamido-2-methyl-propane-1-sulfonic acid) compound is from about 200 to about 10,000.

* * * * *

UNITED STATES PATENT OFFICE
CERTIFICATE OF CORRECTION

PATENT NO. : 4,053,323
DATED : October 11, 1977
INVENTOR(S) : Sally Lee Adams, Michael M. Cook and Fred David Martin It is certified that error appears in the above-identified patent and that said Letters Patent are hereby corrected as shown below:

Column 6, line 46, "for form" should read -- to form --.

Column 7, line 41, "Bringham" should read -- Bingham --.

Column 8, line 45, "(288 ml.)" should read -- (228 ml.) --.

Signed and Sealed this

Thirtieth Day of May 1978

[SEAL]

Attest:

RUTH C. MASON
Attesting Officer

LUTRELLE F. PARKER
Acting Commissioner of Patents and Trademarks